Figure 1:
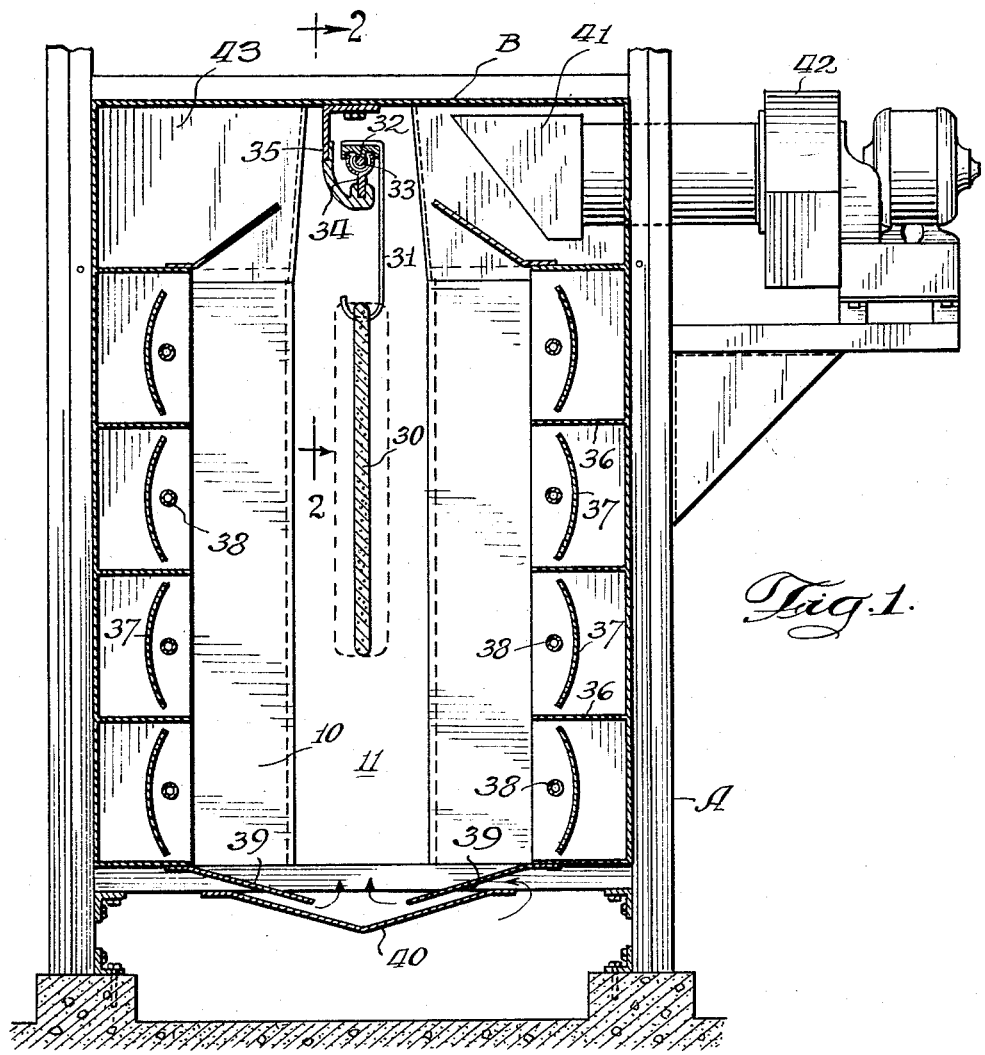

INVENTORS.
Harry W. Weprin
Richard P. Nelson
By Carl C. Batz
attorney

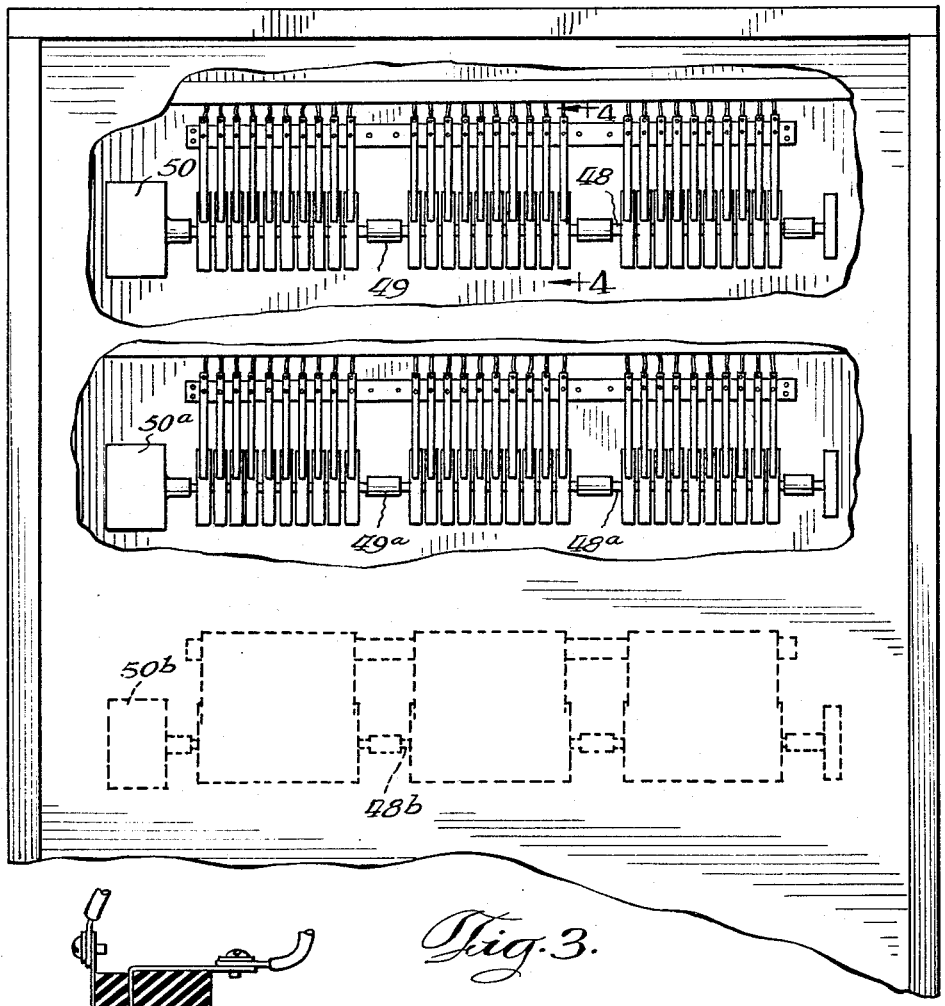
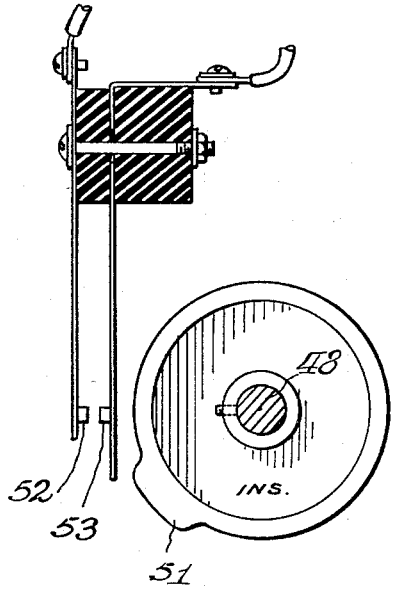

Nov. 29, 1966  H. W. WEPRIN ET AL  3,288,054
APPARATUS FOR COOKING, SMOKING, AND
CHILLING BACON AND OTHER MEATS
Filed Oct. 10, 1960  3 Sheets-Sheet 3
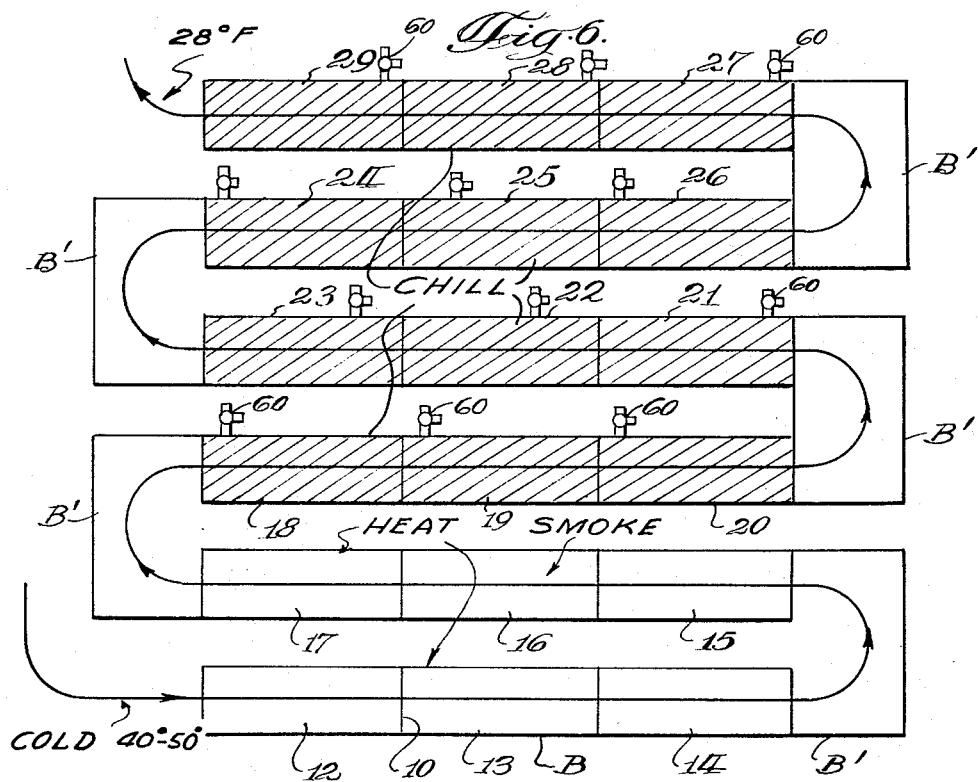
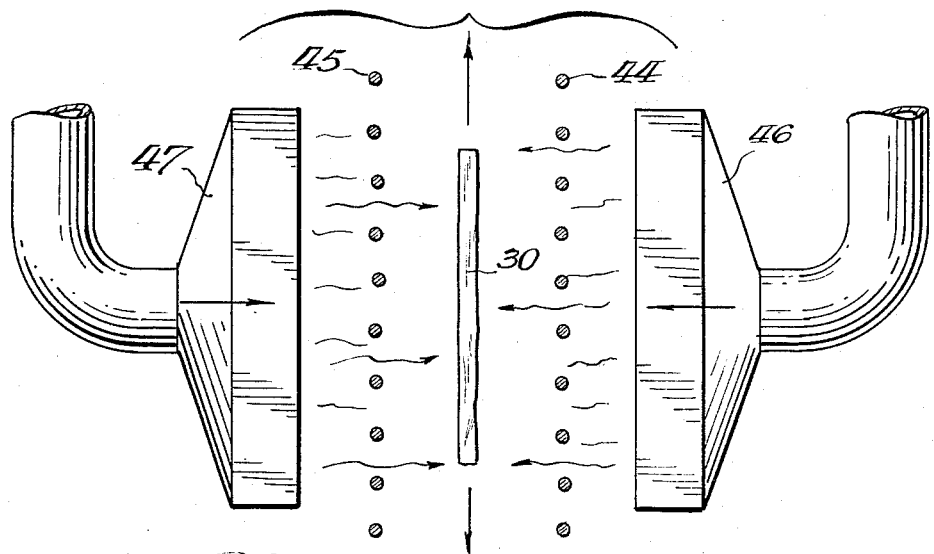
INVENTORS.
Harry W. Weprin
Richard P. Nelson
BY Carl C. Batz
Attorney

United States Patent Office

3,288,054
Patented Nov. 29, 1966

3,288,054
APPARATUS FOR COOKING, SMOKING, AND CHILLING BACON AND OTHER MEATS
Harry W. Weprin, Chicago, and Richard P. Nelson, La Grange, Ill., assignors to Armour and Company, Chicago, Ill., a corporation of Delaware
Filed Oct. 10, 1960, Ser. No. 61,683
4 Claims. (Cl. 99—260)

This invention relates to apparatus for cooking, smoking, and chilling bacon and other meats. The invention is particularly useful in a controlled cooking, smoking, and chilling operation in which meat pieces of different sizes and dimensions are subjected to temperatures best adapted for them and permitting also the recovery of edible rendered pork fat free of smoke, etc.

An object of the invention is to provide apparatus by which pieces of meat varying in dimension may be passed through treating sections while providing pre-selected control means adapted for the treatment of the meat at different stations or sections. Another object is to provide apparatus flexibly adapted for the treating of meat bodies of varying dimension and therefore requiring different heat treatment, whereby by pre-selection, control means will set in operation sectionalied temperature modifying elements for giving each meat body its heating and chilling requirements. A further object is to pass meat pieces at a constant rate through an elongated passage while projecting radiant energy against said meat as it passes therethrough, the amount of the energy projected against the meat per unit distance traveled in the first part of the passage being greater than the amount of energy projected against the meat per unit distance traveled in the latter part of said passage. A still further object is to provide apparatus whereby the heating and smoking of meat may be carried on consecutively so that edible rendered pork fat may be recovered free of smoke or other impurities. Another object is to provide heating apparatus and controls therefor whereby the heat input in a particular section can be terminated substantially instantaneously by the action of a control member. Yet another object is to provide in a continuous heating, smoking, and cooling apparatus control means in the nature of a plurality of control elements which may be individually selected, each element providing for the varying of temperature in individual sections of a passage through which a meat piece is moved, whereby for the meat piece temperature conditions are provided in sequence to meet the treating requirements of the dimensions of the meat piece. Another object is to provide in such apparatus simple means for supporting and conveying pieces of bacon and other meat in spaced-apart relation and at uniform speeds through a sectionalized heating, smoking, and cooling passage. Other specific objects and advantages will appear as the specification proceeds.

The invention is shown, in an illustrative embodiment, by the accompanying drawings, in which—

Figure 2:
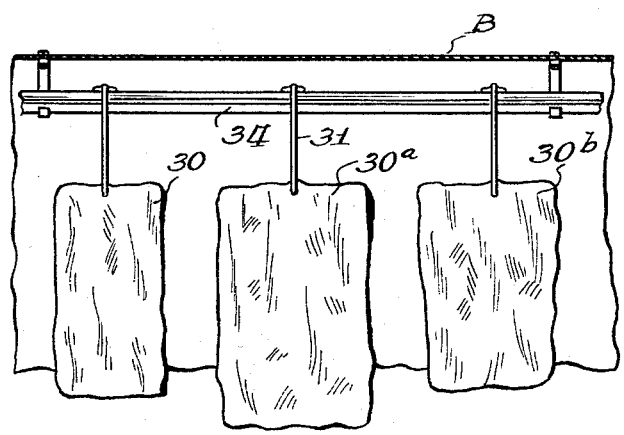

FIGURE 1 is a vertical sectional view of a portion of an apparatus embodying our invention; FIG. 2, an enlarged broken sectional view illustrating the treatment of meat pieces or bodies of varying dimensions; FIG. 3, a broken side view in elevation of selector control apparatus which may be employed for controlling temperature conditions in a tunnel or sectionalized passage through which a meat piece may be passed; FIG. 4, an enlarged sectional view showing a portion of the control apparatus, the section being taken as indicated at line 4—4 of FIG. 3; FIG. 5, a diagrammatic view showing electrostatic means for depositing smoke upon a meat product; and FIG. 6, a diagrammatic view showing the tortuous passage or tunnel through which the meat pieces are passed during the heating, smoking, and cooling operations.

In the illustration given in FIG. 1, A designates a frame support and B an inner casing providing a passage or tunnel through which meat pieces may be passed for treating operations. The casing B, as illustrated diagrammatically in FIG. 6, provides a serpentine passage with straight segments connected by return bend areas B′. The passage is provided at intervals with section walls 10 which divide the long passage into a number of sections, the sections communicating with each other through a central doorway 11, as seen best in FIG. 1. If desired, the passage may be a straight passage.

As illustrated more clearly in FIG. 6, the numerals 12, 13, 14 and 15 indicate heating sections. The numeral 16 indicates a chamber in which smoke is deposited upon the bacon or other piece of meat. The numeral 17 indicates a section in which the temperature is raised to set the deposited smoke upon the meat, and sections 18, 19, 20, 21, 22, 23, 24, 25, 26, 27, 28 and 29 indicate cooling sections in which the meat is chilled to reduce the temperature thereof.

A bacon slab 30, or other meat body which is to be treated, is suspended upon a removable hook 31 having a depending leg portion 32 adapted to fit about the screw 33 of a continuous flexible conveyor mounted upon the support 34 carried by bracket 35. Such a screw conveyor is of well known construction, and need not be described in detail herein. The conveyor, by reason of its flexible construction, permits the meat to be carried not only through the straight portions of passage 11, but also around the return bends of casing B′. Such a conveyor further has the important advantage that the hook 31 can be placed upon the conveyor at any point, since the spiral windings are continuous and in this manner bacon slabs of varying widths can be spaced apart while at the same time supporting sides of bacon for movement in edgewise and closely spaced-apart relation.

In each of the heating sections, we provide a series of vertically spaced partitions 36 and, between the partitions, reflectors 37. Centered within each reflector 37 is an electric heating element 38, as shown more clearly in FIG. 1. The reflectors may be provided with a non-corrosive reflective surface such as a plating of gold or with any other suitable reflective material. The heating element 38 is preferably a quartz lamp which has the important advantage of retaining substantially no heat and upon the breaking of the circuit, no residual heat remains in the element. By the use of such a lamp, it is possible to control with great accuracy the temperature in each section of the treating passage. As an example of the quartz lamp, we may refer to GE Quartz Lamp Type T-3, 3800 watt, 600 volt. By backing such a lamp with an optically correct, highly specular reflector for maximum utilization and uniform distribution of the radiant energy, it is found that effective heating is brought about instantly upon the closing of the circuit while substantially no residual heat remains in the elements after the circuit is opened.

In all of the heating sections 12–15, we provide, at the bottom of casing B, bottom reflectors 39. Stainless steel drip pans 40 deliver the edible rendered pork fat to the entrance end of the casing for recovery. When bacon is being treated, edible rendered pork fat is recovered from the sections 12–15 inclusive, free of smoke, since the smoke is not applied until the section station 16.

An exhaust duct 41 communicating with a blower 42 communicates with an annular chamber 43 in the top of the casing B for the withdrawal of air over the apparatus.

For the deposition of smoke upon the bacon or other meat, we prefer to employ an electrostatic apparatus such as is shown in FIG. 5. In this apparatus, ionizing electrodes 44 and 45 are provided on each side of the bacon slab 30 and the smoke is supplied to the section through the smoke plenums 46 and 47. Since such apparatus is well known, a further detailed description herein is believed unnecessary. It is sufficient to say that the ionizing or polarizing action of the electrodes has the effect of directing the smoke particles into a path intersecting the path of the bacon slab 30 so that in effect the smoke is directed toward the meat product for deposition thereon.

In the cooking operation, it is desired to keep the outside temperature of the bacon below 165° F., and in the heating operation, the lamps are so regulated in the different heating sections so as to constantly raise the interior temperature of the bacon without exceeding the surface temperature of 165°. By way of example, in treating the slab of bacon 30 in section 12, all eight of the lamps may be turned on for 50% of the time to supply maximum heat for raising the surface temperature of the bacon, but thereafter the lamps are turned on in the various sections for decreasing percentages of time, with the result that the temperature of the interior of the bacon slab is gradually raised without exceeding the bacon surface temperature of 165° F.

Variations in the size and dimensions of the bacon slabs are illustrated in FIG. 2 by the numerals 30a and 30b.

In order to effectively control the temperatures to which the meat pieces are subjected as they travel through the apparatus, we provide control units or members which are constantly driven and which operate switches, etc. for controlling the various temperature-modifying elements in the various sections. Referring to FIG. 3, we provide a control member in the form of a cam shaft 48 mounted upon bearings 49 and driven by a timer motor 50. The shaft is equipped with a plurality of adjustable cams 51, as shown best in FIG. 4, which close the contacts 52 and 53 to provide a current flow to heating elements 38 or to other temperature-modifying means.

There are a series of control members, as illustrated in FIG. 3, including the shafts 48, 48a and 48b. The contacts and connections are such that each of the control members operates different lamps and in different sequences and for different time intervals. For example, the motor 50, when it drives the shaft 48, causes certain lamps to go on in the different stations for certain periods of time, while the motor 50a may cause different lamps to go on in the same sections and for different periods of time. Similarly, a different actuation of the heating or temperature-modifying elements is brought about by shaft 48b when the motor 50b is set into operation. In practice, there are a large number of control units or members 48, and these may be selectively operated by an operator by starting the motors, and as a result of such selective operation the operator will know that temperature conditions suitable for a piece of meat of certain dimensions will be applied during its passage through the entire tunnel. On the contrary, if he selects a different control member, he will know that this will provide different conditions but conditions which are suitable for a slab of meat of entirely different dimensions.

In an ordinary operation, the operator standing near the entrance of casing B can note the size of the bacon slabs. If the slabs are running in the order of 6–8 pounds, he may set in operation motor 50, which will supply minimum temperatures and for different periods of time, to give the desired treatment for such a small slab of bacon. On the other hand, if the slabs of bacon are 22–24 pounds, he may set into operation motor 50b, which through the control member 48b will provide heating intervals with lamp exposures and time of heating which will be applicable to the larger slabs of bacon. The operator, however, needs to observe the meat slabs only at the time they are entering the apparatus, and after setting the control for the bacon slabs, he can next consider a new batch of slabs. The apparatus is flexible in that he can, through the use of the automatic controls 48, 48a and 48b, effectively control the temperatures in the successive heating stations and for the desired intervals of time by the preselecting of the controls.

The flexible screw conveyor 33 enables the operator not only to accurately position the slabs of bacon, etc., at desired distances, but he can arrange the bacon slabs so as to send relatively uniformly dimensioned slabs through in batches.

When the heated bacon reaches station 16, it is subjected to the deposition of smoke by the electrostatic means heretofore described, and the smoke is deposited upon the bacon. The bacon slab is then carried into the station 17 where preferably a slightly higher heating is applied for the purpose of setting the smoke upon the bacon. For example, the temperature in section 17 may be raised slightly above the temperature that prevails in section 15 so that the increased temperature tends to set the smoke upon the bacon.

After leaving station 17, it is desired to cool the bacon, and it is carried successively through sections 18 and 19. In the chilling operation, any suitable cooling means may be employed. We prefer to use refrigerated air, and in the several sections the refrigerated air introduced into section 18 is preferably at a very low temperature, such as −30° to −35° F., and thereafter the temperature of the chilling air in the various sections is raised gradually until at the time the bacon slab is discharged from section 29, the exterior and interior temperature of the bacon is approximately 28° F.

As a specific example of the process, the following may be set out:

*Example I*

A slab of bacon 11–15 lbs. (green belly), having a temperature of approximately 40°–50° F., was introduced into section 12, with all of the lamps in operation for about 7 seconds or 50% of the time cycle. This operation brought the surface temperature close to 165° F. In station 13, the lamps were turned on 30% of the time; in station 14, the lamps were on 20% of the time; and in station 15, the lamps were on 15% of the time. In station 16, no heat was applied because smoke was being applied there by electrostatic deposition. In station 17, the lamps were on 25% of the time. As a result of the decrease in temperature application as described, the internal temperature of the bacon rose to 125°, and at this temperature the bacon was introduced into the first cooling section 18. Here, −30° to −35° F. refrigerated air was introduced. In the succeeding section 22, −25° to −15° F. air was introduced. In section 23, −10° F. to zero air was introduced, and through the succeeding cooling chambers the temperature was raised gradually to 25° F. to 28° F., with the result that the bacon slab leaving section 29 had an external surface and internal temperature of 28° F.

Approximately 60 minutes were required for the passage of the bacon through sections 12–17 inclusive, while the chilling section required approximately 3 hours.

In the exposure to heat within the heating areas, not only was the temperature varied or controlled by turning on only some of the lamps, but also the temperature is controlled by the period of time in which the lamps are on. In some of the stations where the treatment may be for 8 minutes or more, 50% of the lamps may be on, but they may be on for only a few seconds during this operation and for the remainder of the operation only 20% of the lamps may be on.

In the above-described examples, edible rendered pork fat was recovered from stations 12–15 inclusive, and this edible rendered pork fat could be used as such because it was not contaminated by smoke.

While most heating elements may be turned off and on during heating operations, there is a residual heat which cannot be controlled and which prevents the application of heat at precise temperatures upon the meat bodies. With the apparatus shown in which quartz lamps are employed, it is found that there is substantially no residual heat and therefore in the various heating sections it is possible to supply the desired heat for the desired length of time and there is no interference with such precise control by residual heat in the temperature-varying elements.

While the lamps may be arranged in different positions, as, for example, in a vertical arrangement or in angular arrangements, we prefer to have them in horizontal position so as to give more effective control with respect to the varying sizes of meat.

While we have described the control means 48, 48a and 48b, etc., for use primarily in control of the heating elements, it will be understood that this mechanism is likewise suitable for the controlling of solenoid-actuated valves 60 for the regulating of the flow of cold or refrigerated air into the various cooling sections, so that for a given weight of bacon or other meat, the operator can control not only the various heating temperatures and times in the different sections, but also the cooling conditions adapted for the particular size of meat slabs as they pass through the cooling sections.

In the cooking operation described above, the piece of meat is fed at a constant rate through the elongated passage while projecting radiant energy against the meat, the amount of the energy projected against the meat per unit distance traveled in the first part of the passage being greater than the amount of energy projected against the meat per unit distance traveled in the latter part of the passage, whereby under the control system employed for operating the lamps in an off and on manner, there is a constant input of heat into the interior of the meat without at any time overheating the outer surface.

While, in the foregoing specification, we have described the use of the process and apparatus in connection with bacon for the purpose of illustration, it will be understood, however, that the apparatus may be used effectively on ham, butts, picnic hams, and a great variety of meats. For example, in the treating of meat bodies or pieces which are not to be smoked, the apparatus and process may be carried out in the same manner as described herein except that the smoke section 16 is not used.

While, in the foregoing specification, we have set forth apparatus and procedure in considerable detail for the purpose of illustrating embodiments of the invention, it will be understood that such details may be varied widely by those skilled in the art without departing from the spirit of our invention.

We claim:

1. In apparatus for heating and cooling meat bodies of varying sizes in sequence for equalizing exterior and interior temperatures thereof, a casing providing an elongated passage having a number of communicating heating sections and a number of communicating cooling sections, means for conveying said meat bodies consecutively through each of said sections, variable means in said heating sections for supplying maximum heat in the foremost sections and reduced heat in the later sections, variable means in said cooling sections for supplying maximum cold in the foremost sections and reduced cold in the succeeding sections, and control means for actuating said temperature-modifying means in order to provide different temperatures in said sections whereby said meat bodies are brought to the desired temperature.

2. The apparatus of claim 1 in which the casing provides a plurality of passages, with each passage having a number of sections therein, and in which said conveying means carries meat bodies first through one passage containing heating sections and then through another passage containing cooling sections.

3. The apparatus of claim 1 in which means are provided for introducing refrigerated air into the cooling sections.

4. In apparatus for heating and cooling bacon slabs of varying sizes in sequence for equalizing the exterior and interior temperatures of the treated slabs, a casing providing a plurality of elongated passages having a number of communicating sections, means for conveying said bacon slabs consecutively through each of said sections, heating elements positioned in the sections of one of said passages, means for introducing smoke into another of said passages following said first-mentioned passage, means for introducing refrigerated air into another of said passages following said smoking passage, and control means for variably actuating said heating elements and said cooling means in order to provide maximum heat in the foremost of said heating sections and maximum cold in the foremost of said cooling sections.

References Cited by the Examiner

UNITED STATES PATENTS

| | | | |
|---|---|---|---|
| 1,837,924 | 12/1931 | Rutherferd | 99—260 |
| 1,891,873 | 3/1932 | Elbe | 99—260 |
| 2,138,813 | 12/1938 | Bemis | 99—352 |
| 2,140,163 | 12/1938 | McKee | 99—107 |
| 2,199,584 | 5/1940 | Bemis | 99—107 |
| 2,400,472 | 5/1946 | Strickland | 99—31 |
| 2,419,119 | 4/1947 | Christensen | 165—19 |
| 2,489,918 | 11/1949 | Menges | 165—19 X |
| 2,500,775 | 3/1950 | Stewart | 165—19 X |
| 2,631,523 | 3/1953 | Olving | 99—331 |
| 2,730,336 | 1/1956 | Shiers | 99—331 |
| 2,855,494 | 10/1958 | Kuebler | 219—35 |
| 2,965,015 | 12/1960 | Huchols. | |
| 2,973,277 | 2/1961 | Barnett et al. | 99—260 |
| 3,003,409 | 10/1961 | Mills | 99—331 |
| 3,073,236 | 1/1963 | Blaschek | 99—260 X |

FOREIGN PATENTS 893,436  10/1953  Germany.

WALTER A. SCHEEL, *Primary Examiner.*

A. H. WINKELSTEIN, N. ANSHER, J. SCHNALL, R. PULFREY, *Examiners.*

H. LORD, G. P. CHANDLER, E. HOROWITZ, C. COUGHENOUR, *Assistant Examiners.*